United States Patent Office 2,757,177
Patented July 31, 1956

2,757,177

BASIC DERIVATIVES OF SUBSTITUTED CYCLO-ALKANECARBOXYLIC ACIDS AND METHODS OF PREPARING SAME

John Krapcho, New Brunswick, and William A. Lott, Maplewood, N. J., assignors to Olin Mathieson Chemical Corporation, a corporation of Virginia No Drawing. Application February 12, 1952, Serial No. 271,273

12 Claims. (Cl. 260—332.2)

This invention relates to, and has for its object, the provision of: (A) bases of the general formula

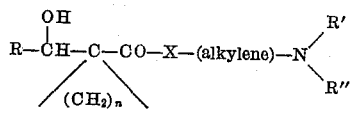

wherein R is a member of the class consisting of aryl and heterocyclic groups, $n$ represents one of the whole numbers 2 to 5 inclusive, X represents a member of the group consisting of O, NH and N(alkyl), and

is an amino group; (B) acid-addition salts of (A); (C) quaternary ammonium salts of (A); and (D) methods of preparing (A), (B) and (C). [The aryl and heterocyclic groups mentioned hereinbefore may be unsubstituted or may contain substituents such as alkyl, alkoxy, hydroxy and halo groups.]

These compounds are useful and advantageous therapeutic agents, especially antispasmodics. Thus, the hydrochloride of 2-diethylaminoethyl 1-(α-hydroxybenzyl)-cyclopropanecarboxylate, a compound representative of group B defined hereinbefore, may be administered in the same general manner (e. g. orally, in tablet form) for the same general purpose (e. g. for reduction of rigidity in Parkinson's disease) and with the same general results as the hydrochloride of β-diethylaminoethyl 1-phenylcyclopentanecarboxylate, an antispasmodic widely used and accepted by the medical profession.

This invention also includes compounds (E) of the general formula

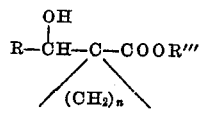

wherein R''' is a member of the class consisting of hydrogen and lower alkyl groups, and R and $n$ have the meaning given hereinbefore, these compounds being intermediates useful in the preparation of compounds A, B, and C of this invention.

Among the preferred compounds are; the bases of the general formula

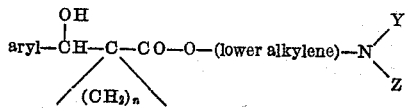

wherein

represents a member of the class consisting of

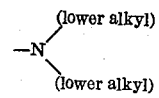

1-piperidyl, 1-pyrrolidyl and 4-morpholinyl; the acid-addition salts thereof; and the quaternary ammonium salts thereof with alkyl halides.

Basic esters of the general formula

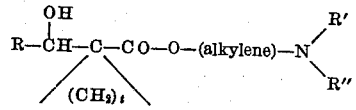

are prepared as follows:

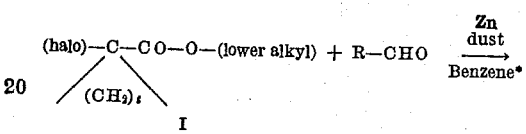

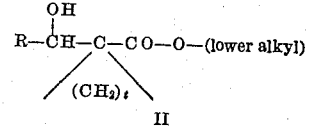

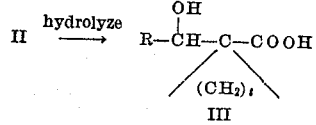

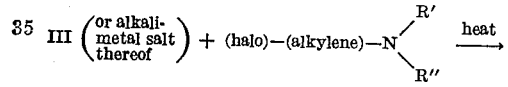

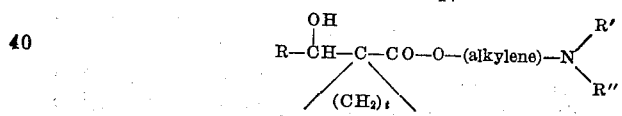

Alternatively, II is prepared as follows:

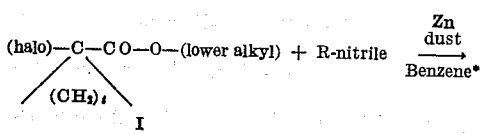

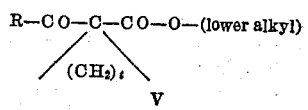

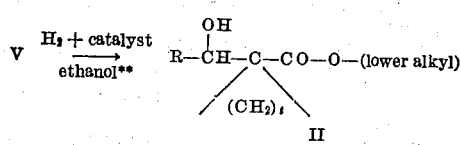

Alternatively, the final product is prepared as follows:

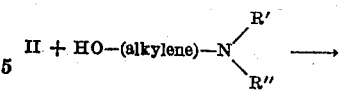

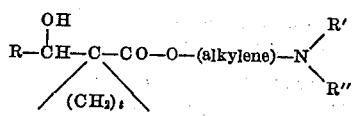

*Or equivalent inert organic solvent.
**Or equivalent organic solvent.

wherein R and

have the meaning given hereinbefore and *t* represents one of the whole numbers 3 to 5 inclusive. (The utilizable R—CHO reactants include inter alia benzaldehyde, thiophenecarboxaldehyde, p-anisaldehyde, and p-tolualdehyde; and in the alternative method analogous nitriles are utilizable.)

The reaction between the acids III and the halides IV occurs in the presence of an organic solvent (especially isopropanol), and the halides IV utilizable in that reaction include inter alia:

2-diethylaminoethyl chloride
3-diethylaminopropyl chloride
3-(1-piperidyl)-propyl chloride
2-(1-pyrrolidyl)-ethyl chloride
2-(4-morpholinyl)-ethyl chloride
3-diethylamino-2,2-dimethylpropyl chloride
2-(1-piperidyl)-ethyl chloride
2-diethylamino-(1-ethyl)-ethyl chloride
2-diethylaminoisopropyl chloride
3-dimethylaminopropyl bromide Basic esters of the invention are prepared alternatively from a member of the class consisting of (VI), the acid-addition salts thereof, and the quaternary ammonium salts thereof, in an organic solvent for the reactant, as follows:

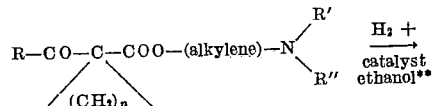

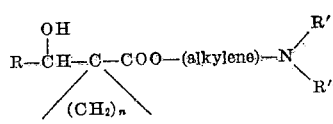

Examples of the utilizable compounds VI include acid-addition salts of the following inter alia:

2 - diethylaminoethyl 1 - benzoylcyclopropanecarboxylate
2 - diethylaminoethyl 1 - anisoylcyclopropanecarboxylate
2 - (1 - piperidyl) - ethyl 1 - benzoylcyclopropanecarboxylate
2 - diethylaminoethyl 1 - (0 - toluyl)-cyclopropanecarboxylate
2 - diethylaminoisopropyl 1 - benzoylcyclohexanecarboxylate
2 - diethylaminoethyl 1 - (p - chlorobenzoyl)cyclopropanecarboxylate
2 - diethylaminoethyl 1 - (2 - thenoyl)cyclohexanecarboxylate
2 - diethylaminoethyl 1 - benzoylcyclobutanecarboxylate
2 - diethylaminoethyl 1 - (3 - thenoyl)cyclopentanecarboxylate
3 - dimethylaminopropyl 1 - benzoylcyclohexanecarboxylate
2 - diethylaminoethyl 1 - benzoylcyclopentanecarboxylate
2 - (4 - morpholinyl) - ethyl 1 - benzoylcyclohexanecarboxylate
2 - diethylamino - (1 - ethyl) - ethyl 1 - benzoylcyclohexanecarboxylate
2 - (1 - pyrrolidyl) - ethyl 1 - benzoylcyclohexanecarboxylate
3 - diethylamino - 2,2 - dimethylpropyl 1 - benzoylcyclohexanecarboxylate
2 - diethylaminoethyl 1 - (3 - pyridylcarbonyl)cyclohexanecarboxylate

[Reactants VI, the acid-addition salts and the quaternary ammonium salts are prepared as described in copending application Serial No. 271,272 of even date, now issued as U. S. Patent 2,688,025.]

The catalytic-hydrogenation employed in both of the foregoing procedures may be effected with a variety of catalysts and under a variety of conditions. Generally, hydrogenation catalysts known to be effective for the conversion of a carbonyl group into a carbinol group may be employed for the purpose of this invention. Among the utilizable catalysts are platinum dioxide (the Adams-platinum-oxide catalyst), Raney nickel, and palladium black. Advantageously, carrier-supported catalysts may also be utilized, such as palladium-carbon or palladium-barium sulfate. In the case of platinum dioxide, the catalytic-hydrogenation may be effected at superatmospheric pressure (e. g., about 2 to 3 atmospheres) and/or at slightly elevated temperatures to expedite the hydrogenation. The time of the hydrogenation (varying with the catalyst and conditions employed) is that required to effect the "addition" of substantially one mole of hydrogen per mole of reactant present. The catalytic-hydrogenation may be effected in any medium which does not chemically affect the reactant, inter alia, ethyl acetate, water, and (preferably) absolute ethanol; and other means than that specifically disclosed hereinafter may be employed to effect intimate contact between the hydrogen and the reactant and hydrogenation catalyst.

As indicated hereinbefore the acids and simple esters E of this invention are useful in the preparation of the compounds A, B and C; and while some of the acids and simple esters are prepared as described hereinbefore (see II and III above) compounds of the general formula

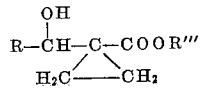

are (preferably) prepared directly by interacting the corresponding keto-acids [such as 1 - benzoylcyclopropanecarboxylic acid, J. Chem. Soc. 47,836 (1885)] or corresponding keto-ester with hydrogen in the presence of a hydrogenation catalyst.

The basic amides of this invention are prepared as follows:

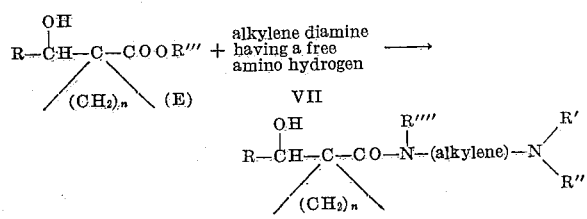

wherein R,

*n* and R''' have the meaning given hereinbefore, and R'''' is a member of the class consisting of hydrogen and lower-alkyl groups. Utilizable alkylene diamines VII having a free amino hydrogen include inter alia:

2 - (1 - piperidyl)ethylamine
2 - (1 - pyrrolidyl)ethylamine
2 - (4 - morpholinyl)ethylamine
3 - dimethylamino - 2,2 - dimethylpropylamine
N,N - dimethyl - N' - ethyl - ethylenediamine
1 - amino - 5 - diethylaminopentane
N,N - dibutyl - ethylenediamine
N,N - diethyl - ethylenediamine
N - (2 - hydroxyethyl) - ethylenediamine Alternatively, amides are prepared from the corresponding keto-compounds VIII (or the acid-addition salts or quaternary ammonium salts thereof) as follows:

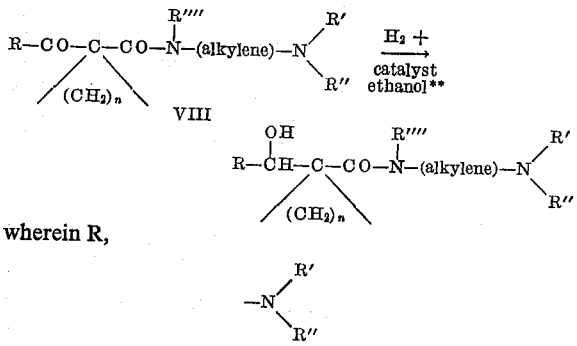

wherein R, $$-N\begin{matrix}R'\\R''\end{matrix}$$

R'''', and $n$ have the meaning given hereinbefore. Utilizable keto-compounds VIII include inter alia:

N - (2 - dimethylaminoethyl) - N - ethyl - 1 - benzoylcyclopentanecarboxamide

N - (3 - dimethylaminopropyl) - 1 - benzoylcyclopropanecarboxamide

N - (2 - diethylaminoethyl) - 1 - benzoylcyclopropanecarboxamide

N - (2 - diethylaminoethyl) - 1 - benzoylcyclobutanecarboxamide

N - (2 - diethylaminoisopropyl) - 1 - benzoylcyclopropanecarboxamide

N - (5 - diethylaminopentyl) - 1 - benzoylcyclopropanecarboxamide

N - (2 - diethylaminoethyl) - 1 - (2 - thenoyl)cyclohexanecarboxamide

N - (2 - [1 - piperidyl] - ethyl) - 1 - benzoylcyclopropanecarboxamide

N - (2 - diethylaminoethyl) - 1 - (3 - pyridylcarbonyl)cyclopropanecarboxamide

[Reactants VIII are prepared as described in copending application Serial No. 271,272 of even date, now issued as Patent 2,688,025.]

In the above methods of preparing the esters and amides the bases may be obtained as such (i. e., as the free base) or in the form of their acid-addition salts (as hydrochlorides, if the halogen in the reactant is chlorine). The acid-addition salts may be converted to the free base in the conventional manner, i. e., by neutralization with alkali; and the free base may be converted to other acid-addition salts by reacting the base with the desired acid in a suitable solvent. The utilizable acids comprise: hydrobromic, boric, nitric, lactic, tartaric, citric, succinic, phosphoric, sulfuric, maleic, fumaric and (especially) hydrochloric, inter alia.

By the addition of alkyl halides, dialkyl sulfates, aralkyl halides, or the like, there are obtained in the usual manner quaternary salts of the aforesaid basic esters and amides (A).

The following examples are illustrative of the invention:

EXAMPLE 1

*Preparation of methyl 1-(α-hydroxybenzyl)cyclobutanecarboxylate*

Approximately 40 ml. of a mixture of 75 g. methyl 1-bromocyclobutanecarboxylate [J. Chem. Soc. 61, 43 (1892)] 50 g. benzaldehyde and 100 ml. benzene is added to 30.5 gm. of zinc dust (which has been previously washed with 5% hydrobromic acid and dried); and the mixture is heated to reflux with the remainder of the ester-aldehyde-solvent mixture added dropwise over a one-half hour period. After refluxing for one additional hour, the mixture is cooled and treated with a solution of 20 ml. concentrated sulfuric acid in 200 ml. of water. After the excess zinc is dissolved (about 30 min.) the mixture is extracted with 500 ml. ether and the extract washed with 100 ml. of dilute sodium bicarbonate solution and dried over magnesium sulfate. The solvent is evaporated and the residue fractionated to yield about 68.0 g. of product; B. P. about 132–135° C./2 mm. [In an analogous manner using methyl 1-bromocyclopentanecarboxylate (J. Chem. Soc. 65, 101) or ethyl 1-bromocyclohexanecarboxylate (J. Chem. Soc. 87, 665) in place of methyl 1-bromocyclobutanecarboxylate, the esters of 1-(α-hydroxybenzyl)cyclopentanecarboxylate and 1 - (α - hydroxybenzyl)cyclohexanecarboxylate respectively are prepared.]

Alternatively, the cyclobutane ester may be prepared as follows:

(a) *Methyl 1-benzoylcyclobutanecarboxylate.*—A mixture of 72.6 g. methyl 1-bromocyclobutanecarboxylate, 25.5 g. benzonitrile, 24.6 g. zinc dust and 500 ml. benzene is heated on a steam bath. After the initial reaction subsides, the mixture is refluxed for thirty minutes, cooled, and treated slowly with a solution of 30 ml. of concentrated sulfuric acid in 250 ml. of water. The mixture is stirred for forty minutes at room temperature, the layers are separated, and the aqueous phase is extracted with 300 ml. ether. The latter ether extract and the organic layer are combined, washed with 100 ml. of sodium bicarbonate and dried over magnesium sulfate. After evaporation of the solvent, the residue is fractionated to yield about 29.5 g. of colorless distillate, B. P. about 117–118° C./4 mm. which solidifies on standing (M. P. about 48–49° C.).

(b) A mixture of 36 g. methyl 1-benzoylcyclobutanecarboxylate, 1.0 g. platinum oxide and 120 ml. ethanol is placed in a Parr apparatus under 54 pounds of hydrogen. The compound consumes the theoretical quantity of hydrogen in one hour; the catalyst is then filtrated, and the solvent is evaporated from the filtrate under reduced pressure. Fractionation of the residue yields about 30 g. of product, B. P. about 140–145° C./3 mm.; $n_D^{28}$ 1.5253.

EXAMPLE 2

*Preparation of 2-diethylaminoethyl 1-(α-hydroxybenzyl)-cyclobutanecarboxylate and the hydrochloride thereof*

(a) *1 - (α - hydroxybenzyl)cyclobutanecarboxylic acid.*—To a cool solution of 6.5 g. potassium hydroxide in 120 ml. of 95% ethanol is added 7.0 g. methyl 1-(α-hydroxybenzyl)cyclobutanecarboxylate, prepared in Example 1; a crystalline colorless salt separates after a few minutes. The mixture is refluxed on a steam bath for thirty minutes, cooled and filtered. The crystalline potassium salt (6 g.) is suspended in 15 ml. water, acidified with 10 ml. dilute sulfuric acid and the liberated acid extracted with ether. After drying the ether extract over magnesium sulfate, the solvent is evaporated and the resulting oil triturated with hexane to yield about 5.0 g. of a colorless solid, M. P. about 110–111° C. This material can be crystallized from benzene and aqueous alcohol.

(b) Sodium (1.34 g.) is dissolved in 300 ml. of isopropyl alcohol and the resulting solution treated with 12.0 g. 1-(α-hydroxybenzyl)cyclobutanecarboxylic acid. After addition of 7.9 g. 2-diethylaminoethyl chloride, the resulting mixture is refluxed for eight hours. The solvent is evaporated under reduced pressure, the residue treated with 20 ml. of water and the free base extracted with 200 ml. of ether. After drying over magnesium sulfate, the solvent is evaporated and the residue fractionated; yield about 12.6 g.; B. P. about 142–147° C./0.15 mm.; $n_D^{27}$ 1.5204. Part of this base (12.27 g.) is dissolved in 10 ml. of isopropyl alcohol and treated with one equivalent of alcoholic hydrogen chloride. Dilution of this solution with 300 ml. ether yields a colorless precipitate, weighing about 12.0 g., M. P. about 81–85° C. After crystallization from 20 ml. butanone, this product melts at about 87–89° C.

EXAMPLE 3

*Preparation of 2-diethylaminoethyl 1-(α-hydroxybenzyl)-cyclopropanecarboxylate and the hydrochloride thereof*

A mixture of 30.0 g. 2-diethylaminoethyl 1-benzoylcyclopropanecarboxylate hydrochloride, 180 ml. absolute ethanol and 0.5 g. platinum oxide is placed in the Parr apparatus under a pressure of 50 lbs. of hydrogen. After the calculated quantity of hydrogen is consumed (in about ninety minutes), the catalyst is filtered off and the filtrate concentrated under reduced pressure. The oily residue is triturated several times with ether and then with ethyl acetate to yield a colorless solid which weighs about 26.5 g.; M. P. about 91–94° C. Part of this material (23.8 g.) is converted to the free base by dissolving in 40 ml. of water and treating with a solution of 3.2 g. sodium hydroxide in 20 ml. water; and the liberated base is then dissolved in ether and dried over magnesium sulfate. After evaporation of the solvent, the residue is distilled; yield about 17 g.; B. P. about 157–160° C./0.2 mm.

When part of the base (15.1 g.) is dissolved in 20 ml. acetone and treated with one equivalent of 3 N ethereal hydrogen chloride, a colorless crystalline product separates from the solution. After dilution with ether, the product is filtered; weighs about 15 g.; M. P. about 100–103° C. Recrystallization from 25 ml. of butanone yields about 13.5 g. product; M. P. about 101–104° C.

EXAMPLE 4

*Preparation of 2-(1-piperidyl)-ethyl 1-(α-hydroxybenzyl)cyclopropanecarboxylate hydrochloride*

Using a molar equivalent of 2-(1-piperidyl)-ethyl 1-benzoylcyclopropanecarboxylate hydrochloride in place of 2-diethylaminoethyl 1-benzoylcyclopropanecarboxylate hydrochloride in Example 3, 2-(1-piperidyl)-ethyl 1-(α-hydroxybenzyl)cyclopropanecarboxylate hydrochloride is obtained.

EXAMPLE 5

Using a molar equivalent of 2-diethylaminoethyl 1-benzoylcyclopentanecarboxylate hydrochloride in place of 2-diethylaminoethyl 1-benzoylcyclopropanecarboxylate hydrochloride in Example 3, 2-diethylaminoethyl 1-(α-hydroxybenzyl)cyclopentanecarboxylate hydrochloride is obtained.

EXAMPLE 6

Using a molar equivalent of 2-diethylaminoethyl 1-benzoylcyclohexanecarboxylate hydrochloride in place of 2-diethylaminoethyl 1-benzocyclopropanecarboxylate hydrochloride in Example 3, 2-diethylaminoethyl 1-(α-hydroxybenzyl)cyclohexanecarboxylate hydrochloride is obtained.

EXAMPLE 7

Using a molar equivalent of 2-diethylaminoisopropyl 1-benzoylcyclohexanecarboxylate hydrochloride, in place of 2-diethylaminoethyl 1-benzoylcyclopropanecarboxylate hydrochloride in Example 3, 2-diethylaminoisopropyl 1-(α-hydroxybenzyl)cyclohexanecarboxylate hydrochloride is obtained.

EXAMPLE 8

Using a molar equivalent of a quaternary ammonium salt (the methobromide) of 2-diethylaminoethyl 1-benzoylcyclopropanecarboxylate, in place of 2-diethylaminoethyl 1-benzoylcyclopropanecarboxylate hydrochloride in Example 3, the methobromide quaternary ammonium salt of 2-diethylaminoethyl 1-(α-hydroxybenzyl)cyclopropanecarboxylate is obtained.

EXAMPLE 9

Using a molar equivalent of the quaternary ammonium salt (the methobromide) of 2-diethylaminoethyl 1-benzoylcyclohexanecarboxylate, in place of 2-diethylaminoethyl 1-benzoylcyclopropanecarboxylate hydrochloride in Example 3, the methobromide quaternary ammonium salt of 2-diethylaminoethyl 1-(α-hydroxybenzyl)cyclohexanecarboxylate is obatined.

EXAMPLE 10

Using a molar equivalent of 2-diethylaminoethyl 1-(2-thenoyl)-cyclohexanecarboxylate hydrochloride, in place of 2-diethylaminoethyl 1-benzoylcyclopropanecarboxylate hydrochloride in Example 3, 2-diethylaminoethyl 1-(α-hydroxy-2-thenyl)cyclohexanecarboxylate hydrochloride is obtained.

EXAMPLE 11

Using a molar equivalent of 3-dimethylaminopropyl 1-benzoylcyclohexanecarboxylate hydrochloride, in place of 2-diethylaminoethyl 1-benzoylcyclopropanecarboxylate hydrochloride in Example 3, 3-dimethylaminopropyl 1-(α-hydroxybenzyl)cyclohexanecarboxylate hydrochloride is obtained.

EXAMPLE 12

21.8 g. ethyl 1-benzoylcyclopropanecarboxylate (Centrablatt, 1912, p. 1458) and 11.6 g. N,N-diethyl-ethylenediamine are mixed and heated at 100° C. for about 6 hours. The reaction mixture is dissolved in 50 ml. absolute ethanol and a slight excess of alcoholic hydrogen chloride is added. Dilution with 500 ml. dry ether yields a precipitate, N-(2-diethylaminoethyl)-1-benzoylcyclopropanecarboxamide hydrochloride, which is purified by crystallization from butanone.

Using a molar equivalent of the latter amide in place of 2-diethylaminoethyl 1-benzoylcyclopropanecarboxylate hydrochloride in Example 3, the product, N-(2-diethylaminoethyl) -1- (α - hydroxybenzyl)cyclopropanecarboxamide hydrochloride is obtained.

EXAMPLE 13

Interaction of methyl 1-(α-hydroxybenzyl)cyclobutanecarboxylate with N,N-diethyl-ethylenediamine yields N-(2-diethyl-aminoethyl)-1-(α-hydroxybenzyl)cyclobutanecarboxamide.

The invention may be variously otherwise embodied within the scope of the appended claims.

We claim:

1. A compound of the class consisting of: bases of the general formula

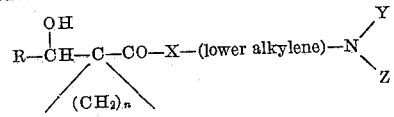

acid-addition salts of the bases; and quaternary ammonium salts of the bases; wherein R is a member of the class consisting of phenyl groups and thienyl groups, $n$ represents one of the whole numbers 2 to 5 inclusive,

represents a member of the class consisting of

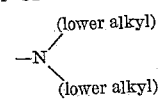

1-piperidyl, 1-pyrrolidyl and 4-morpholinyl, and X represents a member of the class consisting of O and NH groups.

2. Compounds of the general formula

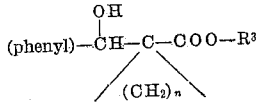

wherein $R^3$ represents a member of the class consisting of hydrogen and lower alkyl groups, and $n$ represents one of the whole numbers 2 to 5 inclusive.

3. The method essentially comprising interacting acids of the general formula

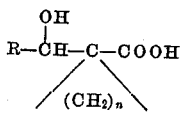
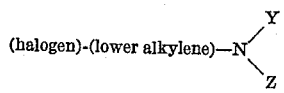

with compounds of the general formula

wherein the halogen is a member of the class consisting of Cl and Br, R is a member of the class consisting of phenyl groups and thienyl groups, $n$ represents one of the whole numbers 2 to 5 inclusive, and

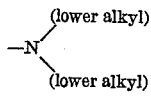

represents a member of the class consisting of $$-N{\overset{\text{(lower alkyl)}}{\underset{\text{(lower alkyl)}}{}}}$$

1-piperidyl, 1-pyrrolidyl and 4-morpholinyl.

4. An acid-addition salt of 2-diethylaminoethyl 1-(α-hydroxybenzyl)cyclobutanecarboxylate.

5. An acid-addition salt of 2-diethylaminoethyl 1-(α-hydroxybenzyl)cyclopropanecarboxylate.

6. 2-diethylaminoethyl 1-(α-hydroxybenzyl)cyclobutanecarboxylate hydrochloride.

7. 2-diethylaminoethyl 1-(α-hydroxybenzyl)cyclopropanecarboxylate hydrochloride.

8. 2-diethylaminoethyl 1-(α-hydroxybenzyl)cyclopentanecarboxylate hydrochloride.

9. The methobromide of 2-diethylaminoethyl 1-(α-hydroxybenzyl)cyclopropanecarboxylate.

10. 2-diethylaminoethyl 1-(α-hydroxy-2-thenyl)cyclohexanecarboxylate hydrochloride.

11. An acid-addition salt of a base of the general formula:

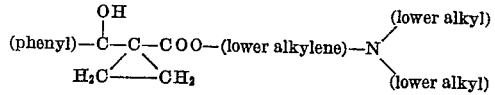

12. An acid-addition salt of a base of the general formula:

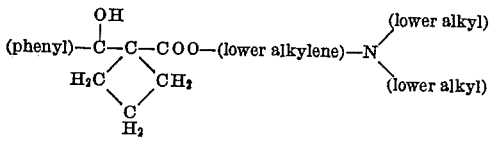

No references cited.